United States Patent [19]

Craig

[11] Patent Number: 4,898,344

[45] Date of Patent: Feb. 6, 1990

[54] HYDRAULICALLY OPERATED WINCH UNITS

[75] Inventor: Thomas M. Craig, Loanhead, Scotland

[73] Assignee: MacTaggart, Scott (Holdings) Ltd., Loanhead, Scotland

[21] Appl. No.: 202,897

[22] Filed: Jun. 6, 1988

[30] Foreign Application Priority Data

Jun. 9, 1987 [GB] United Kingdom ............... 8713423

[51] Int. Cl.$^4$ .............................................. B64F 1/12
[52] U.S. Cl. ..................................... 244/116; 254/361
[58] Field of Search ................ 244/116; 254/361, 329, 254/362

[56] References Cited

U.S. PATENT DOCUMENTS

| | | | |
|---|---|---|---|
| 3,481,584 | 12/1969 | Conry et al. ........................ | 254/329 |
| 3,679,180 | 7/1972 | Callaghan ........................... | 254/172 |
| 4,169,580 | 10/1979 | Hatlapa et al. ..................... | 254/361 |
| 4,488,693 | 12/1984 | Brandt et al. ....................... | 244/116 |
| 4,558,790 | 12/1985 | Bruce-Walker ..................... | 244/116 |

FOREIGN PATENT DOCUMENTS 3317052 11/1984 Fed. Rep. of Germany .
2371374 6/1978 France .

OTHER PUBLICATIONS

Fairey's Helicopter, "Bear Traps", Interavia, Apr. 1965, pp. 530–531.

*Primary Examiner*—Joseph F. Peters, Jr.
*Assistant Examiner*—Anne Sartelle
*Attorney, Agent, or Firm*—Stephen G. Rudisill

[57] ABSTRACT

An aircraft handling system comprises a plurality of hydraulically operated winches, each winch having a wire for connection to the aircraft. Each winch also has a dedicated hydraulic pumpset positioned in proximity thereto. An electrical control unit effects co-operating operation of the winches in order to effect the desired movement and control of the aircraft. The tension in the wire of at least one of said winches is detected, and in response thereto an electrical signal is transmitted to the control unit. An electrical control signal is then transmitted from the control unit to the other winch or winches in order to control the tension in their wires in relation to the wire tension detected in the first winch.

9 Claims, 4 Drawing Sheets

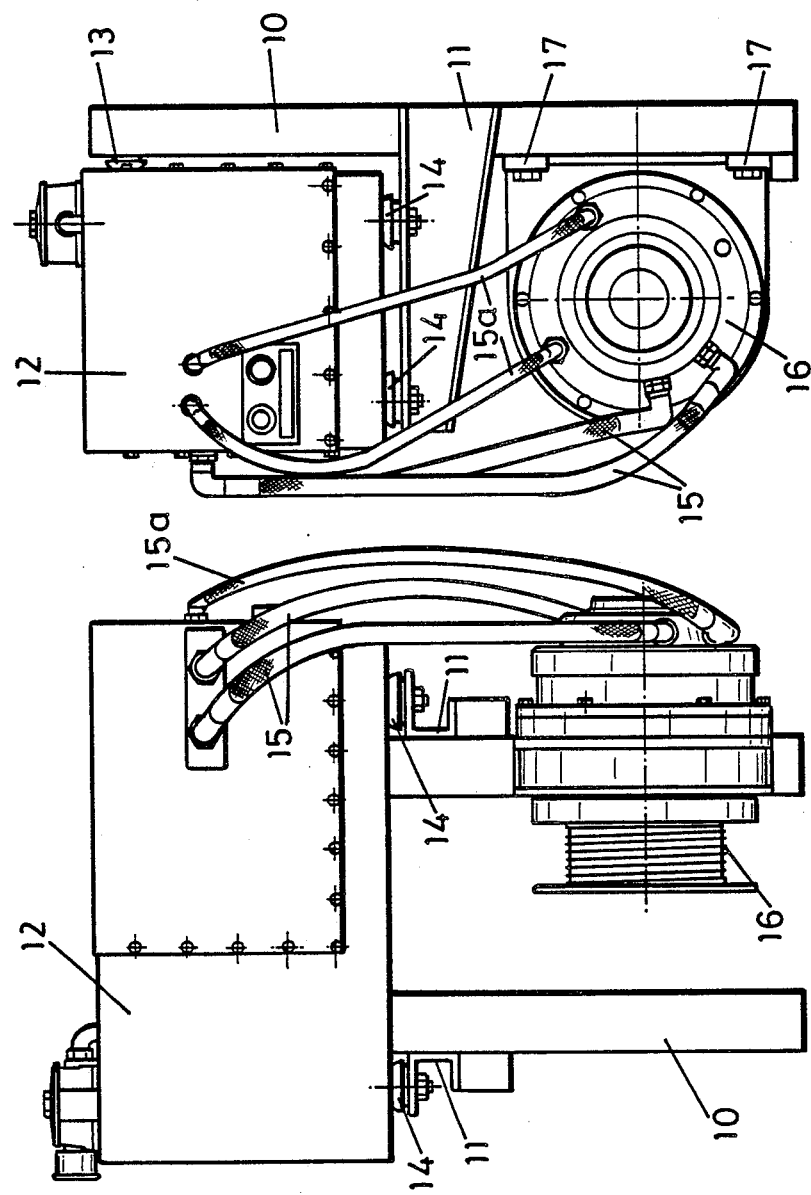

HYDRAULICALLY OPERATED WINCH UNITS

This invention relates to hydraulically operated winch units particularly, but not exclusively, for use in relation to the handling of helicopters, e.g. on board ship.

It was previously been proposed to maneouvre helicopters e.g. from a landing area to a hangar by means of wires carried by a plurality of hydraulic winches. In particular a single hydraulic winch is mounted within the hangar located on the deck of a ship. A further two winches are located fixedly on the deck of the ship aft of the landing area. In order to effect movement of the helicopter from the landing area into the hangar the forward winch is operated to haul the helicopter into the hangar and a back tension is applied to the helicopter by the two aft winches. The tensions applied to the forward and aft winches can be varied in accordance with prevailing conditions e.g. the degree and direction of inclination of the deck area over which the helicopter has to be traversed. Control of the winches is effected by a central control console which is hydraulically connected by means of pipework interconnecting the console to each of the three winches. The interconnecting pipework is commonly laid underneath the deck.

It will be appreciated that the foregoing arrangement involves a considerable amount of hydraulic pipe which is expensive to install, is time consuming to clean and requires constant maintenance in order to ensure that no leaks occur in the pipework which could lead to a fire hazard due to the pipes being pressurized during use.

In addition to the previously proposed three wire winching system described above, similar winching systems have also been previously proposed which incorporate five wires rather than three. In such five wire systems the two aft winching units each have a restraining reel carried by the winch.

An object of the present invention is to provide an improved form of hydraulic winching system which can be used for movement of e.g. helicopters and in which the disadvantages of expensive hydraulic pipework associated with existing systems is obviated or mitigated.

According to the present invention, there is provided an aircraft handling system comprising a plurality of hydraulically operated winches, each winch having a wire for connection to the aircraft, each winch having a dedicated hydraulic pumpset positioned in proximity thereto; a control unit for effecting co-operating operation of the winches in order to effect the desired movement and control of the aircraft; and electrical means extending from the control unit to each of the hydraulic pumpsets for effecting operation thereof.

An embodiment of the present invention will now be described, by way of example, with reference to the accompanying drawings, in which:

FIG. 1 illustrates a front view of a first embodiment of pumpset and winch unit in accordance with the invention;

FIG. 2 is an end view of the unit shown in FIG. 1;

Figure 4:
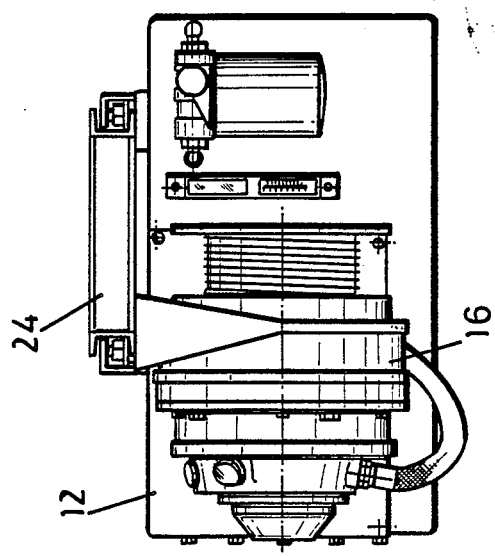
FIG. 4 is a front view of the unit shown in FIG. 3.

Referring to FIGS. 1 and 2 of the drawings, a hydraulic pumpset and winch unit together indicated by the general reference numeral 9 and for use in a helicopter control system comprises a vertical frame member 10 adapted to be bolted to the structure of a ship. Projecting at right angles from the frame member 10 is a horizontal support 11. The frame member 10 and the horizontal support 11 constitute a support structure for a hydraulic pumpset 12, the pumpset 12 being mounted on the vertical frame member 10 and the horizontal support 11 through shock-absorbing mountings 13 and 14 respectively. Supply and return hydraulic hoses 15 and 15a extend from the pumpset 12 to a hydraulically operated winch 16 of known construction and which is bolted by means of bolts 17 to the lower part of the vertical frame member 10.

Figure 7:
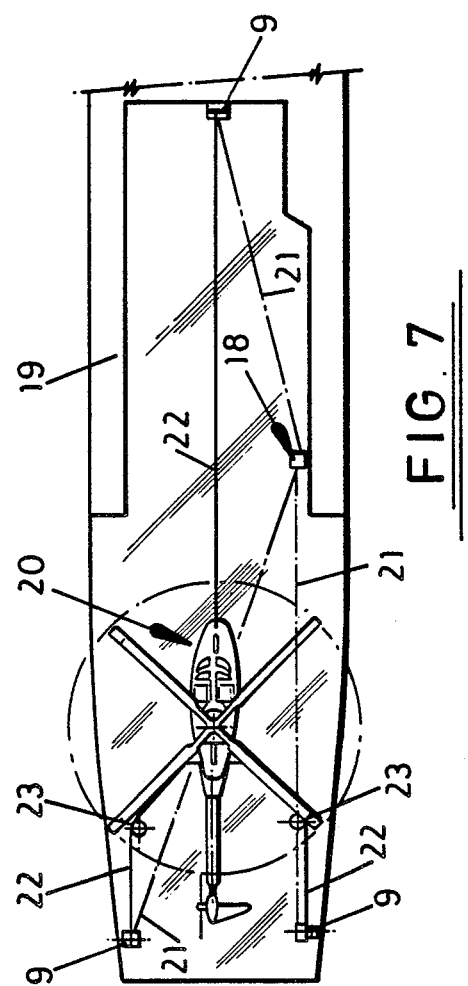
FIG. 7 is a diagrammatic view illustrating the general layout of the system of the invention disposed on the deck of a ship.

The pumpset 12 is electrically controlled by and connected to a control console 18 (FIG. 7).

In a three wire helicopter handling system as illustrated in FIG. 7 a dedicated pumpset and winch unit 9 as described above is located (a) one within a hangar 19 into which a helicopter 20 has to be moved, and (b) two units aft of the landing grid from which the helicopter 20 has to be moved into the hangar. Each pumpset and winch unit 9 is electrically connected to the central control console 18 by means of a multi-core electric control cable 21 (FIG. 7) so that each pumpset and winch unit can be separately controlled for operation independently of the other pumpset and winch units.

Wires 22 from the drum of each winch 16 are led around suitable pulleys and sheaves 23 to the aircraft 20. When the aircraft has to be hauled into the hangar 19 the three pumpsets 12 of units 9a re electrically controlled in order to adjust automatically the relative tensions of the wires 22 in order to provide the correct net hauling forces. Under normal operation the wire from the hangar winch will pull the aircraft forwards with the wires from the two aft winches providing back tension in order to keep the aircraft restrained from undesired movement. If the ship is pitching and the bow is high, the load on the wire from the hangar winch will increase in order to pull the aircraft uphill against gravity rather than against the aircraft. In this situation it will be unnecessary to have a substantial back tension to prevent the aircraft from rolling forwards. The system senses a high tension in the wire from the hangar winch by measuring the hydraulic pressure in the hangar winch unit and automatically adjusts and reduces pressure in the aft winch units in order to reduce the back tension.

Conversely, if the bow of the ship is down the aircraft will tend to roll forwards under the influence of gravity, but pressure being generated to provide a tension in the wire from the hangar winch unit will drop and this reduction in pressure will be automatically sensed and the back tensions of the aft winch units correspondingly increased to prevent the aircraft running forwards. The control acts in a similar manner but in an opposite mode when the aircraft is pulled aft.

the system of the present invention senses the operating hydraulic pressures in the various winch units and effects transmission of electrical signals from the winching units to the control console. The control console 18 processes the signals utilising known electrical circuitry and transmits appropriate electric signals via electric cables 21 to the other winch units in order to effect relative adjustment of the pressures.

Figure 3:
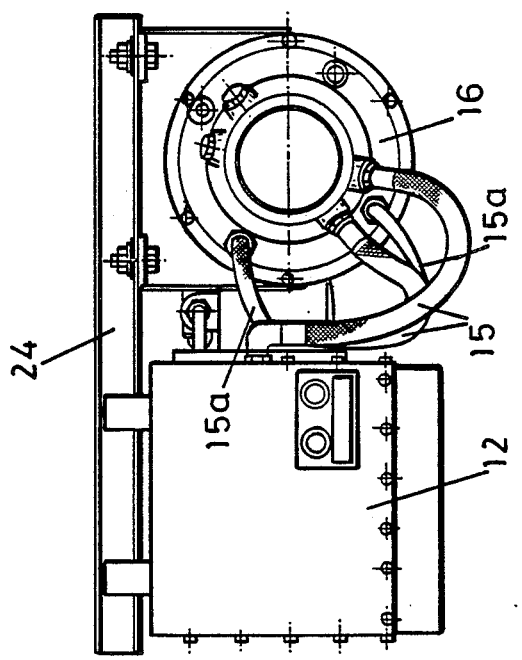
FIG. 3 is an end view of a second embodiment of combined pumpset and winch unit.
Figure 6:
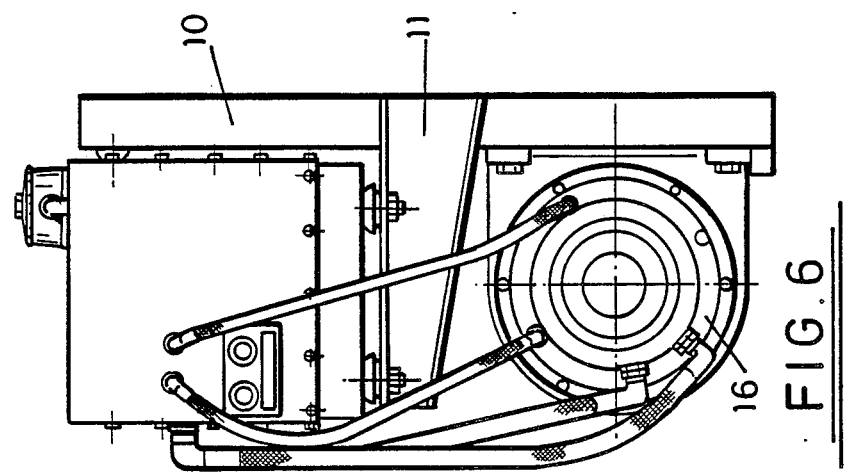
FIG. 6 is an end view of the unit shown in FIG. 5.
Figure 5:
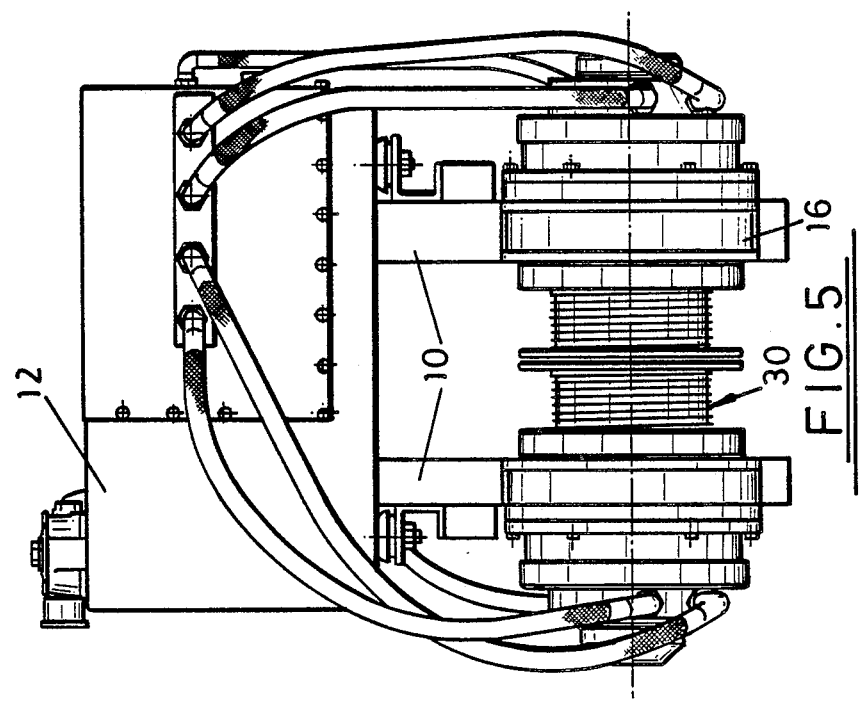
FIG. 5 is a front view of a third embodiment of combined pumpset and winch unit in accordance with the present invention and incorporating a restraining reel.

The embodiment shown in FIGS. 3 and 4 of the drawings operates in an identical manner to that shown in FIGS. 1 and 2 but it will be seen that both the pumpset 12 and winch 16 of each unit 9 are bolted to the underside of a flanged horizontal beam 24. By means of this horizontal beam, the pumpset and winching units can be mounted easily below the deck of a vessel. FIGS. 5 and 6 illustrate an embodiment of pumpset and winching unit which is similar to FIG. 1 in that the pumpset and winching unit is mounted on a vertical support structure. The embodiment shown in FIGS. 5 and 6, however, incorporates an additional restraining reel 30 also hydraulically driven through the intermediary of short hydraulic pipes by its associated pumpset.

It will be readily appreciated that because of the dedicated pumpset and winching units described above, in which the pumpsets are connected to their associated winches by short hydraulic pipes and due to the fact that the control of the pumpsets is effected electrically from a central control console, the extensive inter-connecting pipework of previously proposed systems is eliminated.

In addition to drastically reducing the cost of installation, further benefits accrue due to the units being built, assembled, cleaned and tested in a works environment as opposed to this function being carried out on a ship during installation. Additionally, major maintenance can be carried out on a repair-by-replacement basis by detaching the electric power and control leads and by removing the mounting frame complete with pumpset and winch. A repaired unit can then be simply installed to make the handling system effective in a short time.

Considerable economies can still be realised when other items of deck equipment are hydraulically powered and when the new electrically controlled helicopter handling system is installed. An example of this would be, say, when hydraulically powered mooring capstans are fitted in proximity to the aft helicopter handling winches and when, say, other hydraulically powered units are fitted in proximity to the hangar winch. In this case an aft hydraulic pumpset and a forward hydraulic pumpset are installed. Mounted on or near each pumpset are hydraulic manifolds from which comparatively short lengths of hydraulic pipework lead the hydraulic fluid between the pumpset and the deck units. Electric control of the helicopter handling system is identical to that described above except that the pumpset is mounted a short distance away from the deck units. The advantages of eliminating the interconnecting pipework between the three handling winches and the control console are present with the added bonus that the pumpsets can power other items of deck equipment.

I claim:

1. An aircraft handling system comprising a plurality of hydraulically operated winches, each winch having a wire for connection to the aircraft, and each winch having a dedicated hydraulic pumpset positioned in proximity thereto; an electrical control unit for effecting co-operating operation of the winches in order to effect the desired movement and control of the aircraft; means for detecting the tension in the wire of at least one of said winches and transmitting an electrical signal in response thereto to said control unit; and means for transmitting an electrical signal from the control unit to the other winch or winches in order to control the tension in their wires in relation to the wire tension of said one winch.

2. A system as claimed in claim 1, in which the tension detection and control means for the winch wires are arranged to sense the hydraulic pressure in each winch.

3. A system as claimed in claim 2, in which electrical means are provided extending from the control console to the hydraulic pumpsets, said electrical means comprising a multi-core electric cable whereby each of the pumpsets can be controlled independently of the other pumpsets in order to effect operation of its associated winch.

4. A system as claimed in claim 1, in which electrical means are provided extending from the control console to the hydraulic pumpsets, said electrical means comprising a multi-core electric cable whereby each of the pumpsets can be controlled independently of the other pumpsets in order to effect operation of its associated winch.

5. A system as claimed in claim 1, in which each associated winch and pumpset is carried by a common support structure and the winch and pumpset are interconnected through supply and return hydraulic hoses.

6. A system as claimed in claim 1 in which the winch and pumpset are mounted on the support structure by means of shockabsorbing mountings.

7. A method of controlling movement of an aircraft comprising providing a plurality of electrically controlled hydraulically-operated winches each having a wire for connection to the aircraft and each winch having a dedicated hydraulic pumpset positioned in proximity thereto; detecting the tension in the wire of at least one of said winches and transmitting an electrical signal in response thereto to a control unit; and transmitting an electrical signal from the control unit to the other winch or winches in order to control the tension in their wires in relation to the wire tension of said one winch.

8. A method as claimed in claim 7, comprising sensing variations in the tension in one of the control wires and automatically adjusting the tension in the other control wires as necessary to effect control of the aircraft.

9. A method as claimed in claim 7, comprising sensing the hydraulic pressure of each winch in order to effect detection and control of the tension in the winch.

* * * * *